(12) United States Patent
Harvey

(10) Patent No.: US 8,506,434 B2
(45) Date of Patent: Aug. 13, 2013

(54) ISOLATING DECOUPLER

(75) Inventor: John Harvey, Novi, MI (US)

(73) Assignee: The Gates Corporation, Denver, CO (US)

( * ) Notice: Subject to any disclaimer, the term of this patent is extended or adjusted under 35 U.S.C. 154(b) by 373 days.

(21) Appl. No.: 12/931,061

(22) Filed: Jan. 24, 2011

(65) Prior Publication Data

US 2012/0186938 A1    Jul. 26, 2012

(51) Int. Cl.
*F16H 7/02*    (2006.01)
*F16D 3/66*    (2006.01)
*F16F 15/26*    (2006.01)

(52) U.S. Cl.
USPC ............ 474/94; 192/41 R; 192/55.5; 464/57; 474/199

(58) Field of Classification Search
USPC ......................................... 192/55.5; 474/199
See application file for complete search history.

(56) References Cited

U.S. PATENT DOCUMENTS

| | | | |
|---|---|---|---|
| 5,122,521 A | 6/1992 | Yamada | 474/69 |
| 5,722,521 A | 3/1998 | Awaji et al. | 192/45 |
| 6,044,943 A | 4/2000 | Bytzek et al. | 192/41 |
| 2005/0215366 A1 * | 9/2005 | Serkh | 474/74 |
| 2005/0250607 A1 | 11/2005 | Jansen et al. | |
| 2010/0099527 A1 * | 4/2010 | Rolando et al. | 474/94 |
| 2011/0065537 A1 * | 3/2011 | Serkh et al. | 474/94 |

FOREIGN PATENT DOCUMENTS

| | | |
|---|---|---|
| EP | 1 619 410 A1 | 1/2006 |
| WO | 97/31198 A1 | 8/1997 |
| WO | 2011/160208 A1 | 12/2011 |

* cited by examiner

*Primary Examiner* — Rodney Bonck
(74) *Attorney, Agent, or Firm* — J. A. Thurnau; P. N. Dunlap

(57) ABSTRACT

An isolating decoupler comprising a hub, a one-way clutch engaged with the hub, a pulley rotationally engaged with the hub, a spring operationally engaged between the one-way clutch and the pulley, and an inertia member engaged with the hub through an elastomeric member, the inertia member substantially disposed within a width of the pulley, the inertia member moveable independently of the pulley.

5 Claims, 3 Drawing Sheets

ISOLATING DECOUPLER

FIELD OF THE INVENTION

The invention relates to an isolating decoupler, and more particularly, to an isolating decoupler having a one-way clutch and an inertia member attached to the hub, all contained within a pulley width.

BACKGROUND OF THE INVENTION

Vehicle internal combustion engines typically comprise a front end belt driven accessory drive. The accessories can include power steering, an alternator, water pump and so on. The accessory drive can also be referred to as a serpentine drive since the belt often traces a circuitous path about the front plane of an engine.

A typical serpentine drive system includes a driving pulley on the crankshaft of an internal combustion engine of the vehicle, a series of driven pulleys for the accessories and a poly-V belt trained about the driving and driven pulleys. An advantage of the serpentine drive is that by providing an automatic belt tensioner on the belt the accessories can be fixedly mounted.

It is also known to provide a decoupler assembly between the belt driven accessory and the pulley to allow the belt driven accessory to operate temporarily at a higher speed or "overrun" the pulley as the pulley oscillates with the speed of the engine.

It is known that alternator pulley can contain one-way clutch, resilient member, or both one-way clutch and resilient member. It is also known that the same approach can be used for crankshaft pulley. In the latter case not only the alternator inertia will be isolated from the belt drive but the inertia of all accessories. At the same time torque requirement is substantially higher as well as challenges for all other elements of the crankshaft isolator.

For a crankshaft isolator with no decoupling feature, the spring stiffness is chosen such that the torsional vibration present at the nose of the crankshaft is attenuated by its elastic element and prevented this vibration from affecting the ABDS in a negative manner. Although beneficial during engine operation, the presence of the device on the crankshaft during start-up and shut down can present challenges. Because the spring stiffness is such that the first system natural frequency is below idle, during start up, the engine RPM passes through this natural frequency causing exaggerated relative motion between the device's pulley and hub. This causes large deformations of the elastic element and can result in fatigue fractures and catastropic failure. This failure can be prevented by the use of stop(s) between the pulley and the hub that limit the travel of the elastic element. However, the stops must be placed and designed correctly to prevent objectionable noise during the start up phase of engine operation.

Representative of the art is U.S. Pat. No. 6,044,943 which discloses a crankshaft decoupler that has a mounting hub, a pulley rotatably mounted on the mounting hub, an annular carrier mounted within said pulley, a biasing device mounted therebetween, and a one way clutch mounted between the annular carrier and the pulley. The biasing device cushions the belt drive from crankshaft impulses and lowers the angular resonant frequency of the belt system. The one way clutch prevents sudden reversal of the belt tension in the drive due to start/stop of the engine or sudden deceleration of the engine and prevents momentary reverse slip belt squeal as a result of the tensioners' inadequate output for the reverse mode. The one way clutch limits the maximum amount of torque which may be transmitted preventing belt slippage during momentary overload.

What is needed is an isolating decoupler having a one-way clutch and an inertia member attached to the hub, all contained within a pulley width. The present invention meets this need.

SUMMARY OF THE INVENTION

The primary aspect of the invention is an isolating decoupler having a one-way clutch and an inertia member attached to the hub, all contained within a pulley width.

Other aspects of the invention will be pointed out or made obvious by the following description of the invention and the accompanying drawings.

The invention comprises an isolating decoupler comprising a hub, a one-way clutch engaged with the hub, a pulley rotationally engaged with the hub, a spring operationally engaged between the one-way clutch and the pulley, and an inertia member engaged with the hub through an elastomeric member, the inertia member substantially disposed within a width of the pulley, the inertia member moveable independently of the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
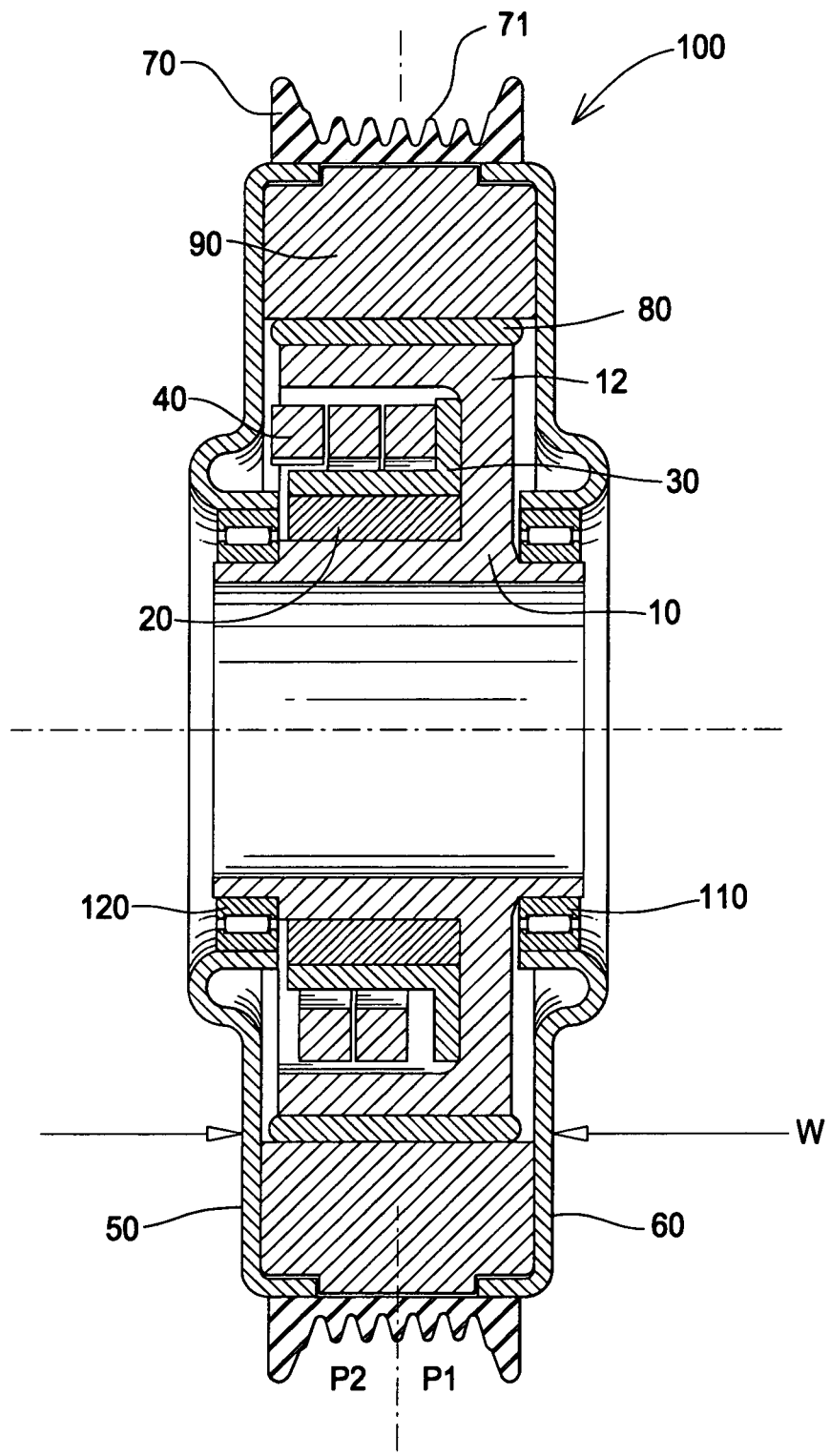
FIG. 1 is a cross-section of the device.

FIG. 1 is a cross-section of the device. The isolating decoupler comprises a hub 10. Hub 10 can be mounted to a shaft such as a crankshaft or driven accessory shaft (not shown).

A one-way clutch 20 is mounted to the hub 10. One-way clutch 20 is typically press fit onto the clutch carrier 30. The clutch 20 engages a hub 10.

A first end 41 of torsion spring 40 is connected to clutch carrier 30. The second end 42 of torsion spring 40 is connected to a pulley support member 50.

Pulley 70 is mounted to pulley support 50 and pulley support 60. Pulley 70 comprises a belt engaging surface 71.

Elastomeric ring 80 is connected to hub 10. Inertia ring 90 is connected to elastomeric ring 80. The inertia ring combined with the elastomeric ring damp crankshaft oscillations and vibrations caused during engine operation. Elastomeric ring 80 is securely fixed between inertia ring 90 and hub 10 using known adhesives, or mechanical, or press fit.

Pulley assembly 50, 60, 70 is rotationally moveable with respect to hub 10 on each bearing 110, 120. Inertia ring 90 moves independently of the pulley assembly 50, 60, 70.

Bearings 110, 120 may comprise ball bearings or any other suitable bearing known in the art.

All components of the device are contained within an envelope axially defined by the pulley support 50 and pulley support 60, and radially defined by the pulley 70.

Figure 2:
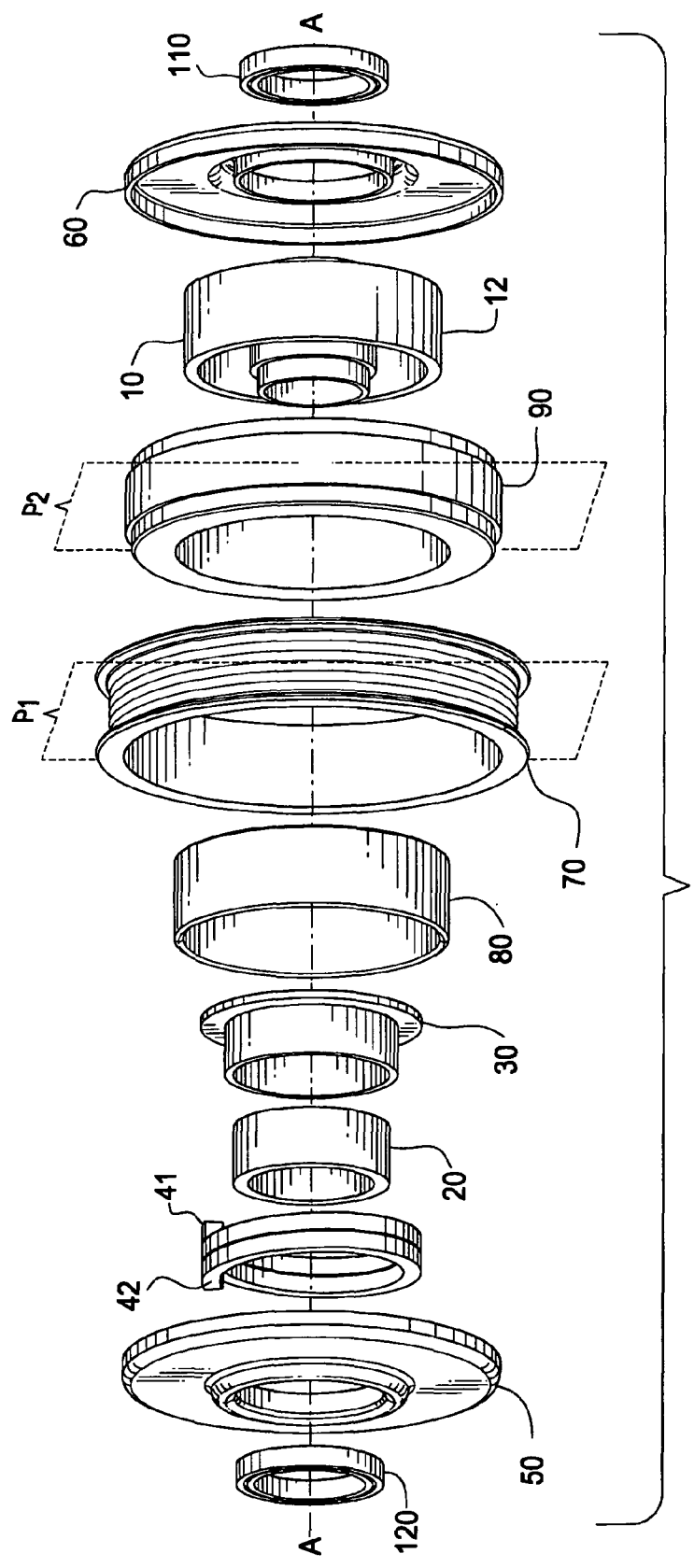
FIG. 2 is an exploded view of the device.

FIG. 2 is an exploded view of the device. A plane P2 intersects the circumference of the inertia ring 90. A plane P1 intersects the circumference of the pulley 70. In the assembled device plane P1 is coplanar with plane P2, hence, inertia ring 90 is radially aligned with pulley 70 with respect to axis of rotation A-A. Spring 40 is contained within an axial length of the hub 10 between each pulley support 50 and pulley support 60.

Figure 3:
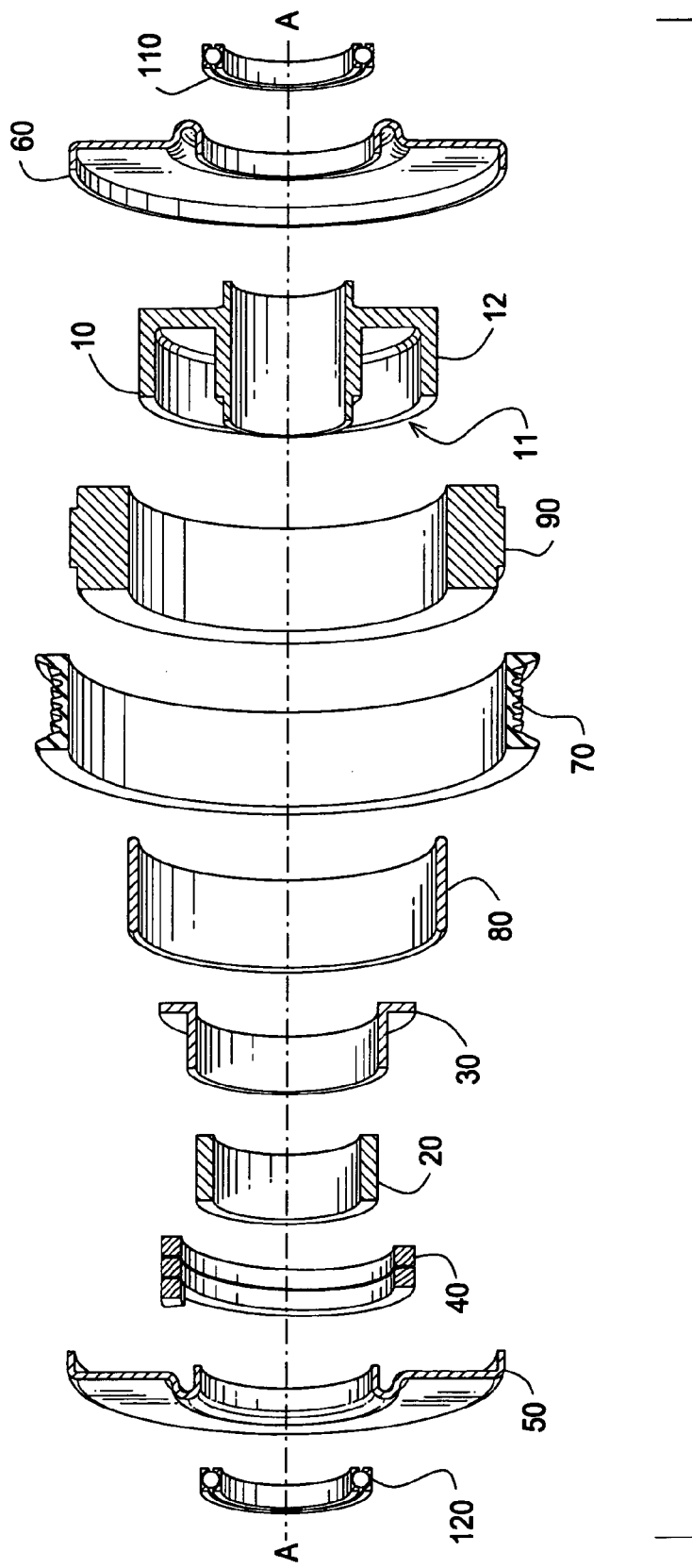
FIG. 3 is a cross-sectional exploded view of the device.

FIG. 3 is a cross-sectional exploded view of the device. Spring 40, one-way clutch 20 and clutch carrier 30 are each contained within receiving portion 11 of hub 10. Elastomeric ring 80 is engaged with hub outer member 12.

In operation the inertia member 90 and elastomeric ring 80 absorb and damp crankshaft torsional vibrations, thereby preventing the vibrations from applying high loads to the crankshaft and or affecting the belt drive system. The one-way clutch decoupler feature allows high inertia components of the belt drive system to temporarily "overrun" the crankshaft during periods of rapid engine deceleration. The device combines the decoupling feature and the isolator feature into a compact package which can be used on an engine crankshaft in confined spaces.

Although a form of the invention has been described herein, it will be obvious to those skilled in the art that variations may be made in the construction and relation of parts without departing from the spirit and scope of the invention described herein.

I claim:

1. An isolating decoupler comprising:
   a hub;
   a one-way clutch engaged with the hub;
   a pulley rotationally engaged with the hub on a first ball bearing and second ball bearing;
   a spring operationally engaged between the one-way clutch and the pulley; and
   an inertia member engaged with the hub through an elastomeric member, the inertia member disposed within an envelope comprising the pulley and a first pulley support engaged with the first ball bearing and second pulley support engaged with the second ball bearing, the inertia member moveable independently of the pulley.

2. The isolating decoupler as in claim 1 further comprising a carrier member disposed between the spring and the one-way clutch.

3. The isolating decoupler as in claim 1, wherein the inertia member is substantially coplanar with the pulley.

4. An isolating decoupler comprising:
   a hub;
   a one-way clutch engaged with the hub;
   a pulley rotationally engaged with the hub through a first pulley support and a second pulley support;
   a spring operationally engaged between the one-way clutch and the first pulley support;
   a carrier member disposed between the spring and the one-way clutch; and
   an inertia member engaged with the hub through an elastomeric member, the inertia member substantially disposed within a width of the pulley and the inertia member is substantially coplanar with the pulley, the inertia member moveable independently of the pulley.

5. The isolating decoupler as in claim 4 further comprising a first ball bearing between the hub and the first pulley support and a second ball bearing between the hub and the second pulley support.

* * * * *